United States Patent
Hu et al.

(10) Patent No.: US 8,327,227 B2
(45) Date of Patent: Dec. 4, 2012

(54) STORAGE APPARATUS, METHOD FOR ACCESSING DATA AND FOR MANAGING MEMORY BLOCK

(75) Inventors: Chia-Ming Hu, New Taipei (TW); Chun-Yu Hsieh, Taichung (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 0 days.

(21) Appl. No.: 13/437,936

(22) Filed: Apr. 3, 2012

(65) Prior Publication Data

US 2012/0192033 A1 Jul. 26, 2012

Related U.S. Application Data

(62) Division of application No. 12/022,112, filed on Jan. 29, 2008, now Pat. No. 8,176,382.

(30) Foreign Application Priority Data

Nov. 9, 2007 (TW) ............................... 96142491 A

(51) Int. Cl.
*G11C 29/00* (2006.01)
(52) U.S. Cl. ............... 714/763; 365/185.09; 365/185.33
(58) Field of Classification Search .................. 714/763; 365/185.09, 185.33
See application file for complete search history.

(56) References Cited

U.S. PATENT DOCUMENTS

| | | | | |
|---|---|---|---|---|
| 5,559,956 A | * | 9/1996 | Sukegawa | 714/6.13 |
| 5,603,001 A | * | 2/1997 | Sukegawa et al. | 711/103 |
| 5,617,530 A | * | 4/1997 | Stallmo et al. | 714/6.12 |
| 5,661,848 A | * | 8/1997 | Bonke et al. | 711/112 |
| 5,673,383 A | * | 9/1997 | Sukegawa | 714/6.13 |
| 5,911,779 A | * | 6/1999 | Stallmo et al. | 714/6.12 |
| 6,000,006 A | | 12/1999 | Bruce | |
| 6,725,343 B2 | * | 4/2004 | Barroso et al. | 711/145 |
| 6,823,429 B1 | * | 11/2004 | Olnowich | 711/141 |
| 2003/0041298 A1 | | 2/2003 | Bruner | |
| 2003/0058762 A1 | | 3/2003 | Schultz | |
| 2003/0135793 A1 | | 7/2003 | Craig | |
| 2007/0198786 A1 | | 8/2007 | Bychkov | |
| 2008/0072118 A1 | | 3/2008 | Brown | |
| 2009/0077429 A1 | | 3/2009 | Yim | |

* cited by examiner

*Primary Examiner* — Esaw Abraham
(74) *Attorney, Agent, or Firm* — Winston Hsu; Scott Margo

(57) ABSTRACT

A method for managing a memory block is provided. In this method, a plurality of block tables having different storing priorities is provided. In addition, the number of error correction bits in the memory block is checked. Thereby, in the present invention, data is stored into the memory block in a block table according to the number of error correction bits in the memory block so that the sequence in which the memory block is used for storing data is determined.

16 Claims, 6 Drawing Sheets

STORAGE APPARATUS, METHOD FOR ACCESSING DATA AND FOR MANAGING MEMORY BLOCK

CROSS REFERENCE TO RELATED APPLICATIONS

This is a division of U.S. application Ser. No. 12/022,112, filed on Jan. 29, 2008, and U.S. Pat. No. 8,176,382 has been issued for U.S. application Ser. No. 12/022,112 on May 8, 2012.

BACKGROUND

1. Technical Field

The present invention generally relates to a technique for accessing data and managing memory blocks, in particular, to a technique for accessing data and managing memory blocks which can extend the lifespan of a storage apparatus.

2. Description of the Conventional Art

FIG. 1 is a diagram of a non-volatile memory structure. Referring to FIG. 1, the non-volatile memory 100 (for example, a flash memory) includes a plurality of memory blocks, such as memory blocks 102, 104, and 106, for storing data. These memory blocks are arranged as an array therefore can be referred as a memory block array. Each of the memory blocks has a storage space of a particular capacity. However, errors may occur to some bits in these memory blocks after these memory blocks are used for some time, and these erroneous bits may be referred as error bits. Conventionally, when error bits are found in a memory block, these error bits are corrected through bit correction and the corrected bits are detected as error correction bits or error correction code (ECC).

FIG. 2 is a diagram illustrating a conventional method for managing a memory block. Referring to FIG. 2, the conventional non-volatile memory (for example, a flash memory) can be divided into a normal block table 202 and a disabled block table 204. Conventionally, a memory block is placed into the normal block table 202 when the number of error correction bits in the memory block is determined to be lower than a predetermined value. Accordingly, data in the memory blocks in the normal block table 202 of the flash memory can be accessed normally.

On the other hand, if the number of error correction bits in a memory block is determined to be higher than the predetermined value (N-Bit ECC), for example, higher than 4, data error may occur when data is stored in the memory block. Thus, conventionally, this memory block is placed into the disabled block table 204 so that data will not be stored into a memory block in the disabled block table 204. If the disabled block table 204 has no more available space, the flash memory will be locked so that data cannot be written into the flash memory anymore.

Even though the memory blocks in the normal block table are all usable memory blocks, many usable memory blocks are actually at the edge of being disabled. For example, assuming the above predetermined value is 4, the numbers of error correction bits in some memory blocks may be 3 or exactly 4. Namely, these memory blocks have to be moved from the normal block table 202 to the disabled block table 204 once another 1 or 2 error correction bits occur in these memory blocks. However, conventionally, how many error correction bits a memory block of a non-volatile memory has is not taken into consideration when data is stored into the memory block. Thus, if those memory blocks at the edge of being disabled are always used for data accessing, these memory blocks will soon be disabled and accordingly the lifespan of the non-volatile memory will be shortened.

SUMMARY

Accordingly, the present invention is directed to a storage apparatus having extended lifespan.

The present invention is directed to a method for accessing data. The method is suitable for a storage apparatus and can extend the lifespan of the storage apparatus.

The present invention is directed to a method for managing a memory block. The method can manage the healthiness of a storage apparatus effectively so as to extend the lifespan thereof.

The present invention provides a storage apparatus including an interface unit, an access control unit, and a memory unit. The interface unit is coupled to the access control unit, and the access control unit is coupled to the memory unit. The access control unit receives data through the interface unit and stores the data into the memory unit, or the access control unit reads data from the memory unit and sends the data to a data transmission interface through the interface unit for transmission. The memory unit includes a plurality of memory blocks and a plurality of block tables. Each of the memory blocks has n error correction bits, wherein n is a positive integer greater than or equal to 1. In addition, the block tables respectively have different storing priorities. Those memory blocks having the same number of error correction bits are placed into the same block table, and the less error correction bits a memory block has, the higher storing priority the block table has in which the memory block is placed. Thus, the access control unit can store data into the memory blocks of each block table according to the storing priority of the block table.

The present invention provides a method for reading data that capable of reading data from above storage apparatus. In this method, data is read from a memory block in the storage apparatus, and whether the memory block being read has error bits is checked. If the memory block has error bits, the error bits are corrected and detected as error correction bits. In addition, the block table in which the memory block is placed is determined according to the number of error correction bits in the memory block so that the memory blocks in each block table have the same number of error correction bits. The block tables respectively have different storing priorities, and the less error correction bits a memory block has, the higher storing priority of the block table has in which the memory block is placed.

The present invention provides a method for storing data. In this method, a plurality of block tables respectively having different storing priorities is provided. Besides, a plurality of memory blocks is provided, and these memory blocks can be respectively placed into the block tables. In addition, each of the memory blocks has n error correction bits, wherein n is a positive integer greater than or equal to 1. Those memory blocks having the same number of error correction bits can be placed into the same block table. Thus, data can be stored into the memory blocks of each block table according to the storing priority of the block table.

The present invention provides a data accessing method for a storage apparatus. In this method, a plurality of block tables having different storing priorities is provided, and a plurality of memory blocks respectively having n error correction bits is provided, wherein n is a positive integer greater than or equal to 1. While reading data from a memory block, in which block table the memory block is placed can be determined according to the number of error correction bits in the memory block, so that the memory blocks in each block table have the same number of error correction bits. In addition, the less error correction bits a memory block has, the higher storing priority the block table has in which the memory block is placed. Moreover, while storing data into the storage apparatus, the data can be stored in the memory blocks of each block table according to the storing priority of the block table.

The present invention provides a method for managing a memory block. In this method, a plurality of block tables having different storing priorities is provided. In addition, the number of error correction bits in the memory block is checked. The memory block is placed into one of the block tables according to the number of error correction bits in the memory block, so that the sequence in which the memory block is used for storing data can be determined.

According to an embodiment of the present invention, the block tables include a plurality of normal block tables and a disabled block tables. When the number of error correction bits in a memory block is not greater than a predetermined value, the memory block is placed into one of the normal block tables. On the other hand, when the number of error correction bits in a memory block is greater than the predetermined value, the memory block is placed into the disabled block table so that it will not be used for storing data.

In the present invention, those memory blocks having the same number of error correction bits are placed into the same block table so that the healthiness of a storage apparatus can be effectively managed. Moreover, in the present invention, data is stored into memory blocks in each block table according to the storing priority of the block table, so that the lifespan of the storage apparatus can be effectively extended.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
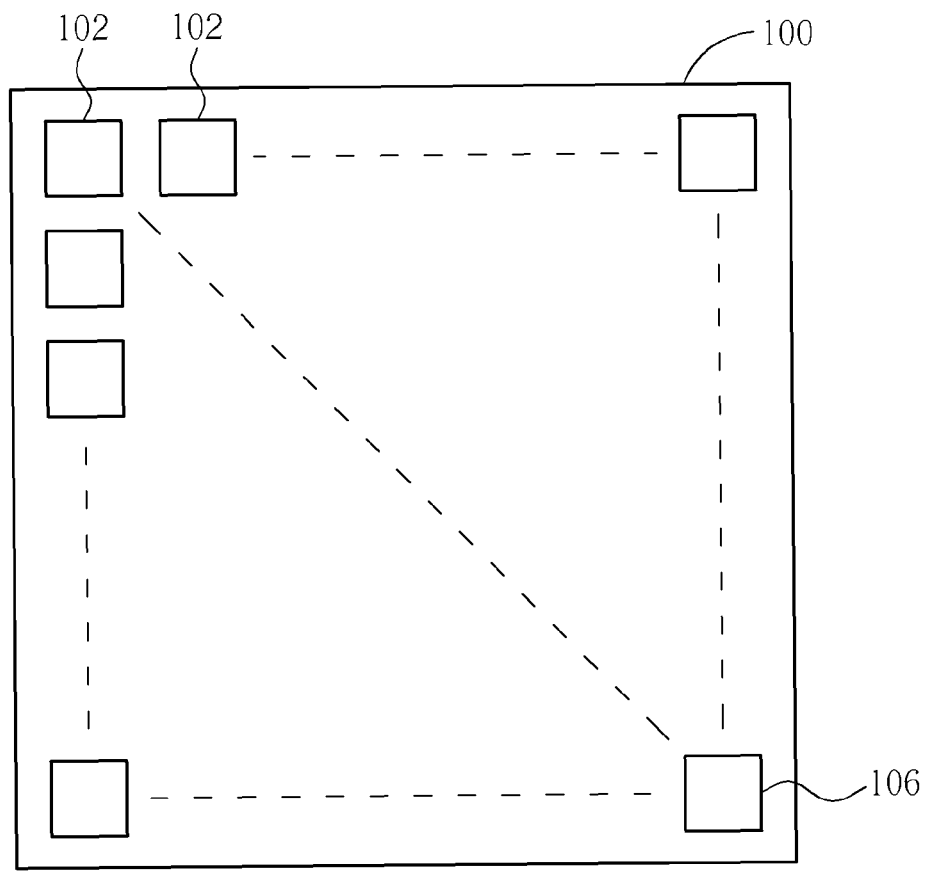
FIG. 1 is a diagram of a non-volatile memory structure.
Figure 2:
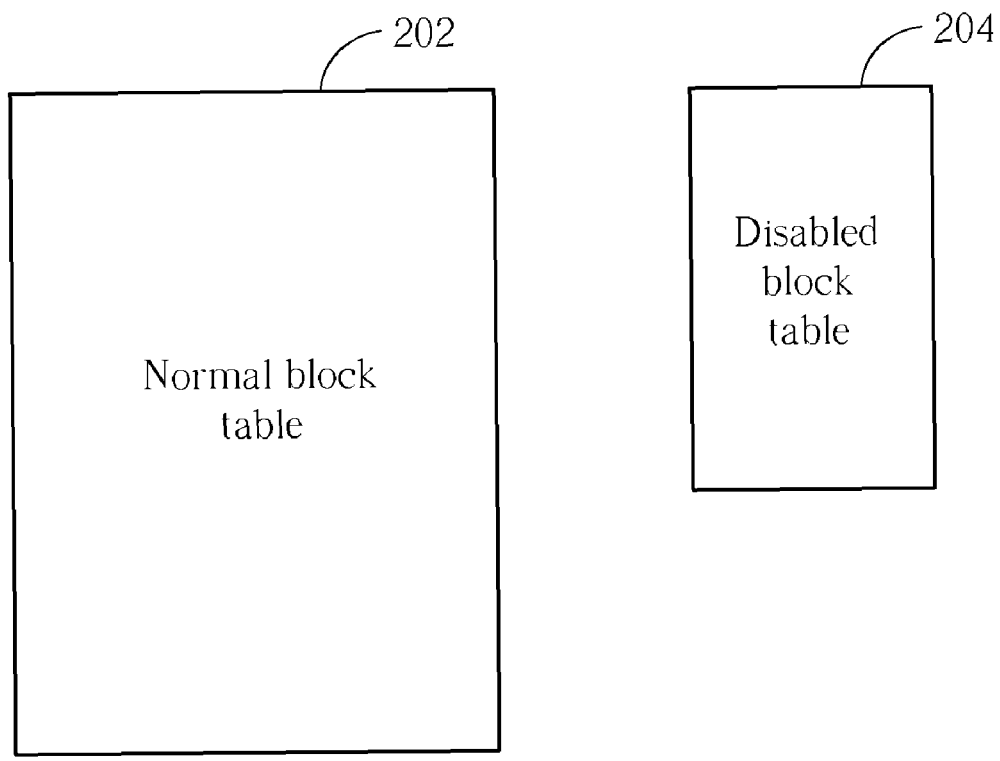
FIG. 2 is a diagram illustrating a conventional method for managing a memory block.

Reference will now be made in detail to the present preferred embodiments of the invention, examples of which are illustrated in the accompanying drawings. Wherever possible, the same reference numbers are used in the drawings and the description to refer to the same or like parts.

Figure 3:
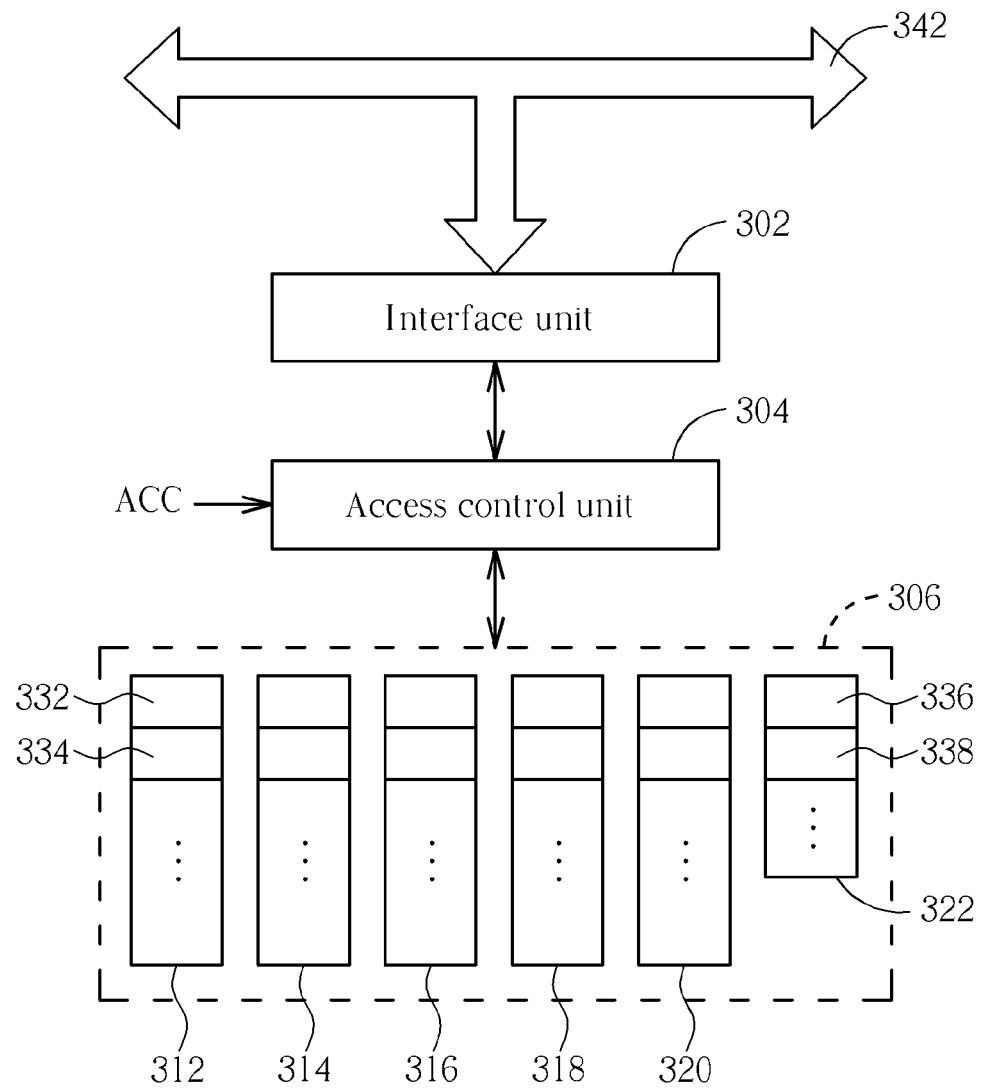
FIG. 3 is a block diagram of a storage apparatus according to an embodiment of the present invention.

FIG. 3 is a block diagram of a storage apparatus according to an embodiment of the present invention. Referring to FIG. 3, the storage apparatus 300 includes an interface unit 302, an access control unit 304, and a memory unit 306. The interface unit 302 is coupled to a data transmission interface 342 and the access control unit 304, and the access control unit 304 is coupled to the memory unit 306. The access control unit 304 stores a data received by the interface unit 302 from the data transmission interface 342 into the memory unit 306. In addition, the access control unit 304 reads a data from the memory unit 306 and sends the data to the data transmission interface 342 through the interface unit 302. In the present embodiment, the data transmission interface 342 may be a wireless or cable transmission interface, such as a universal serial bus (USB).

The memory unit 306 may be a flash memory and which has a plurality of block tables, such as block tables 312, 314, 316, 318, 320, and 322. In addition, the memory unit 306 further has a plurality of memory blocks, such as memory blocks 332, 334, 336, and 338, and these memory blocks are respectively placed in at least one of the block tables 312, 314, 316, 318, 320, and 322. In the present embodiment, the block tables are categorized into normal block tables 312, 314, 316, 318, and 320 and a disabled block table 322. The access control unit 304 will not access the memory blocks (for example, the memory blocks 336 and 338) in the disabled block table 322, and the reason for that will be described below.

Particularly, the block tables have different storing priorities, for example, the block table 312 has the highest storing priority, the block table 314 has the second highest storing priority, and the block table 320 has the lowest storing priority. In addition, each of the memory blocks has n error correction bits, wherein n is a positive integer greater than or equal to 1. In the present embodiment, those memory blocks having the same number of error correction bits are placed in the same block table. For example, all the memory blocks in the block table 312 have 0 error correction bit. In other words, all the memory blocks in the block table 312 are normal memory blocks.

Additionally, the less error correction bits a memory block has, the higher storing priority the block table has in which the memory block is placed. For example, a memory block having no error correction bit is placed in the block table 312, and a memory block having only one error correction bit is placed in the block table 314, and so on.

Figure 4:
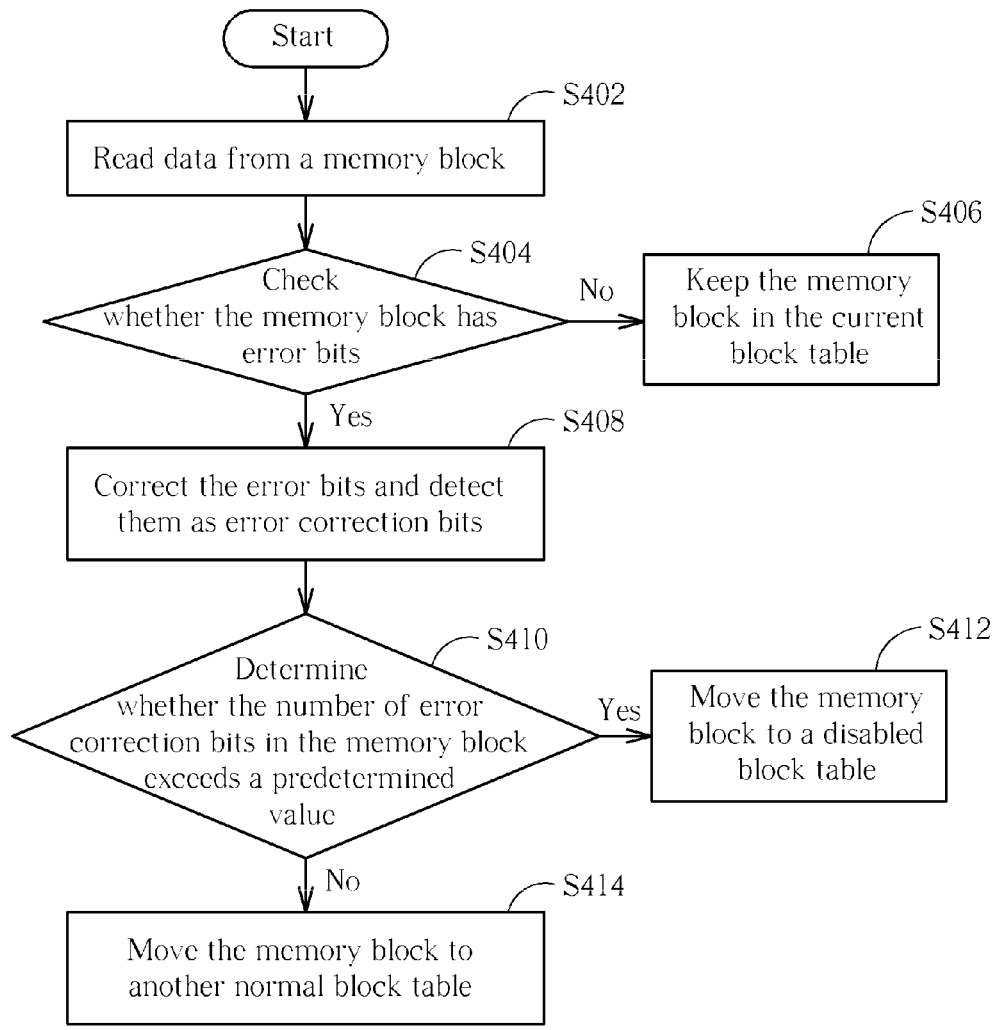
FIG. 4 is a flowchart illustrating a method for reading data according to an embodiment of the present invention.

FIG. 4 is a flowchart illustrating a method for reading data according to an embodiment of the present invention. Referring to both FIG. 3 and FIG. 4, when the access control unit 304 receives an access command ACC and is about to read a data from the memory unit 306, the access control unit 304 reads the data from the corresponding memory block, as in step S402. Next, in step S404, the access control unit 304 checks whether the memory block has error bits.

In step S406, the access control unit 304 keeps the memory block in the current block table after it reads the data if the access control unit 304 determines that the memory block does not contain any error bit (as "no" in step S404). On the other hand, in step S408, the access control unit 304 corrects the error bits and detects them as error correction bits when the access control unit 304 determines that there are error bits in the memory block (as "yes" in step S404).

In step S410, the access control unit 304 determines whether the number of error correction bits in the memory block exceeds a predetermined value. In the present embodiment, the predetermined value may be 4. When the access control unit 304 determines that the number of error correction bits in the memory block is greater than the predetermined value (as "yes" in step S410), which means data stored in this memory block has non-recoverable bit error, the access control unit 304 executes step S412 to move the memory block to the disabled block table 322, so that the access control unit 304 does not use the memory block in the disabled block table 322 for storing data when next time a data is stored.

Contrarily, if the number of error correction bits in the memory block does not exceeds the predetermined value (as "no" in step S410), the access control unit 304 moves the memory block to the corresponding normal block table according to the number of error correction bits in the memory block, as in step S414. For example, the access control unit 304 determines that a 1 bit program code is erroneous when the access control unit 304 reads a data in the memory block 332 in the block table 312. Here, the access control unit 304 corrects the error bit in the memory block 332 and then detects the error corrected bit as an error correction bit, as in step 408. In step S414, since there is only 1 error correction bit in the memory block 332, the access control unit 304 moves the memory block 332 from the block table 312 to a normal block table or keeps the memory block 332 in the current block table, such as the block table 314.

Figure 5:
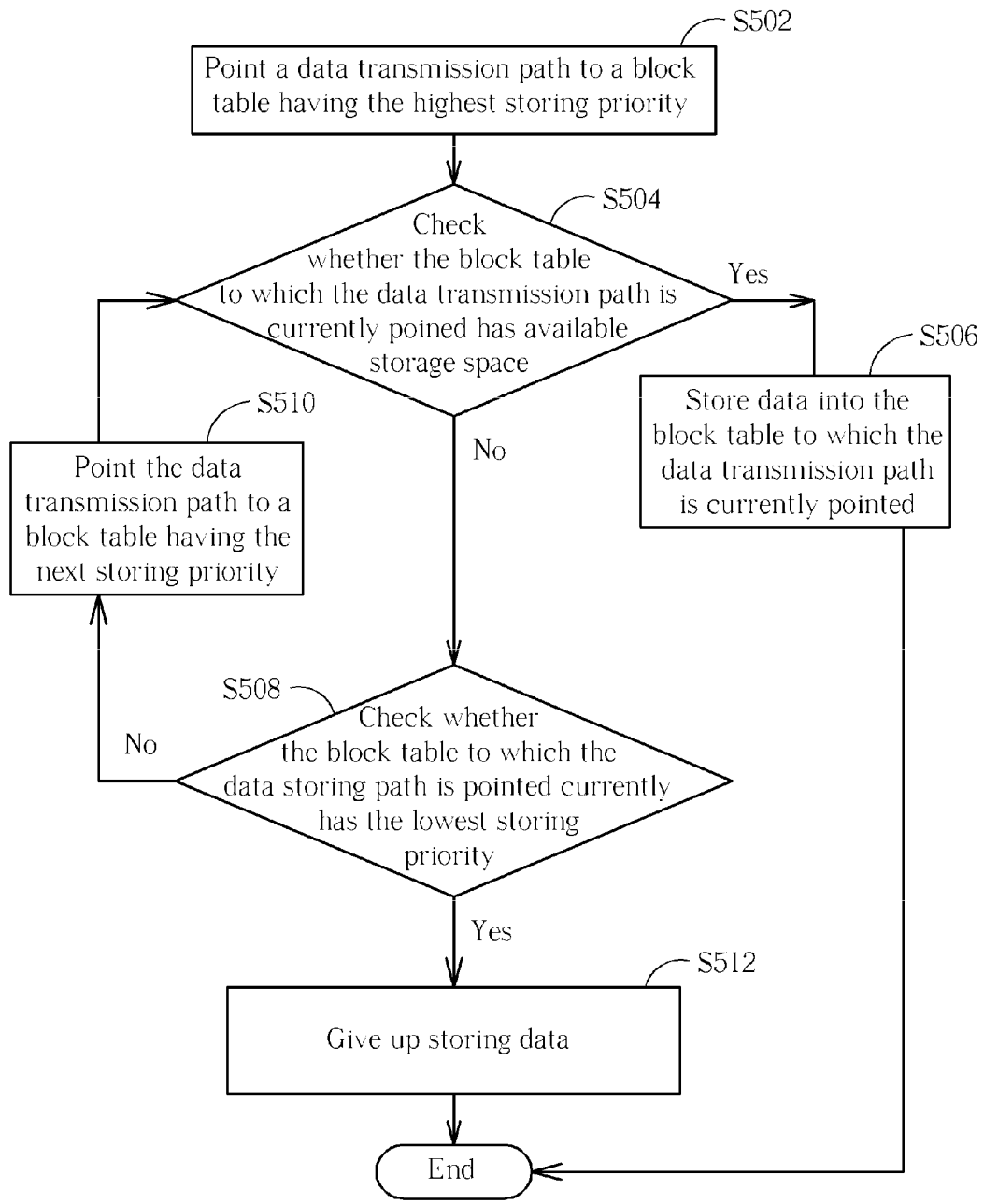
FIG. 5 is a flowchart illustrating a method for storing data according to an embodiment of the present invention.

FIG. 5 is a flowchart illustrating a method for storing data according to an embodiment of the present invention. Referring to both FIG. 3 and FIG. 5, when the interface unit 302 receives a data from the data transmission interface 342 and is about to store the data into the storage apparatus 300, the interface unit 302 sends the received data to the access control unit 304 first. In step S502, a data transmission path is pointed to the block table having the highest storing priority, for example, the block table 312, by the access control unit 304 according to an access command ACC. As described above, the memory block placed in the block table 312, for example, the memory blocks 332 and 334, may be complete memory blocks without any error correction bit. Thus, data access can be carried out to these memory blocks frequently.

Additionally, the access control unit 304 checks whether or not the block table to which the data transmission path is currently pointed has available storage space for storing data, as in step S504. Presently, the data transmission path is pointed to the block table having the highest storing priority, namely, the block table 312. Thus, the access control unit 304 checks whether the memory blocks in the block table 312 has extra storage space for storing data. Assuming that there is still extra storage space in the block table 312 for storing data (as "yes" in step S504), the access control unit 304 executes step S506 to store the data into the block table to which the data transmission path is currently pointed (i.e. the block table 312).

Contrarily, if the access control unit 304 determines that the block table 312 has no more extra storage space, the access control unit 304 executes step S508 to check whether the block table to which the data transmission path is currently pointed has the lowest storing priority. Since the data transmission path is currently pointed to the block table 312 and the block table 312 does not have the lowest storing priority (as "no" in step S508), the access control unit 304 points the data transmission path to the block table having the next storing priority, as in step S510.

Here it is assumed that the storing priority of the block table 314 is next to that of the block table 312, and all the memory blocks placed in the block table 314 have only 1 error correction bit. When the block table 312 does not have extra storage space for storing data, the access control unit 304 points the data transmission path to the block table 314 and then repeats steps S504 etc until a block table having extra storage space for storing data is found.

Here it is assumed that the block table 320 is the block table having the lowest storing priority in the memory unit 306. If the access control unit 304 sequentially points the data transmission path from the block table 312 to the block table 320 and none of these block tables has extra storage space, and while executing step S508, the access control unit 304 determines that the block table 320 is the block table having the lowest storing priority which also has no extra storage space for storing data, the access control unit 304 can directly execute step S512, namely, give up storing the data since the block table 322 is a disabled block table and accordingly the memory blocks placed therein are not used for storing data.

Figure 6:
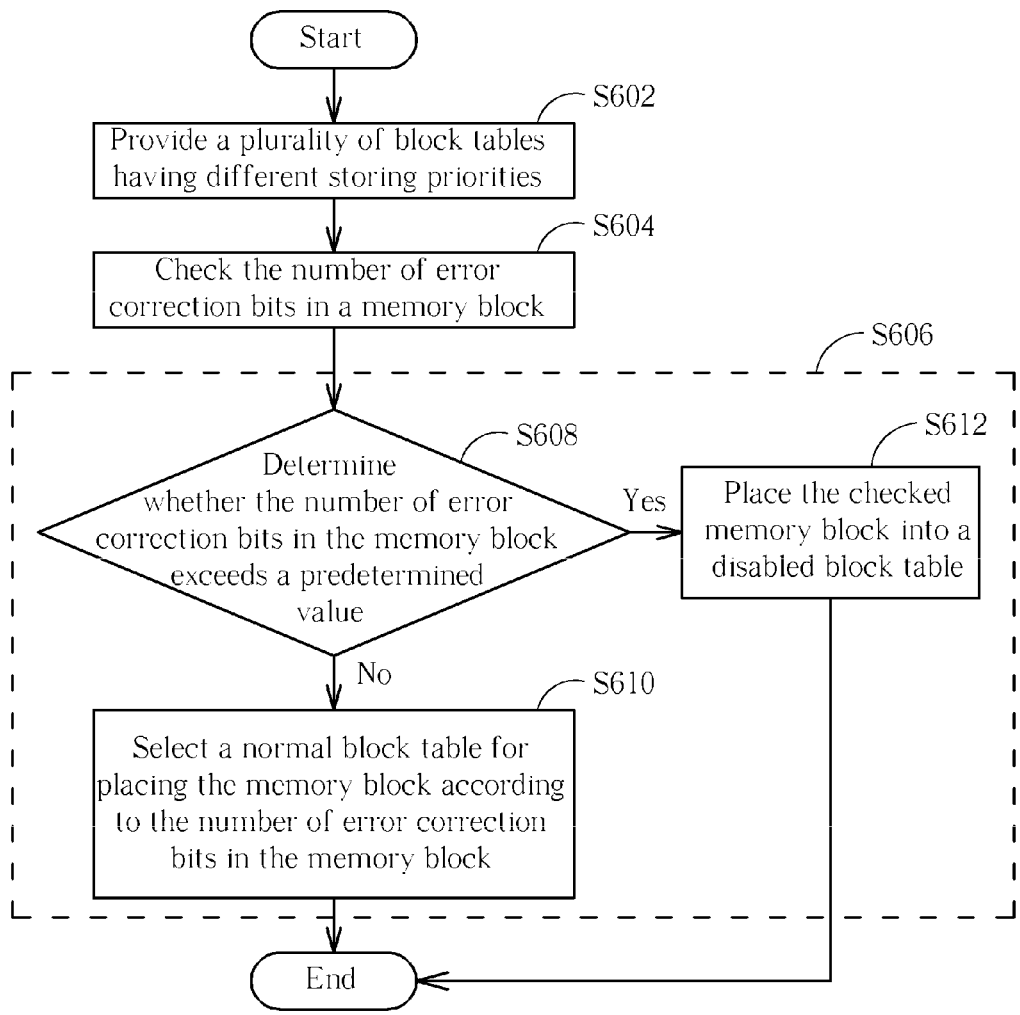
FIG. 6 is a flowchart illustrating a method for managing a memory block according to an embodiment of the present invention.

FIG. 6 is a flowchart illustrating a method for managing a memory block according to an embodiment of the present invention, wherein the method is suitable for a storage apparatus. Referring to FIG. 6, in the present embodiment, a plurality of block tables having different storing priorities is provided, as in step S602. In the present embodiment, these block tables include one or multiple normal block tables and a disabled block table, wherein the functions of these tables have been described above therefore will not be described herein. Next, in step S604, the number of error correction bits in the memory block in one or plural normal block tables are checked. Thus, according to the present invention, a block table can be selected for placing a memory block according to the number of error correction bits in the memory block being checked, as in step S606.

Step S606 will be described in detail herein. In the present embodiment, after the step S604 is executed, whether the number of error correction bits in the memory block exceeds a predetermined value is determined, as in step S608. If the number of error correction bits in the memory block does not exceed the predetermined value (as "no" in step S608), which means the memory block being checked is normal or usable, a normal block table is selected for placing the memory block according to the number of error correction bits in the memory block, as in step S610.

On the other hand, if it is determined that the number of error correction bits in the memory block being checked exceeds the predetermined value (as "yes" in step S608), which means the memory block cannot be used for storing data anymore thus the memory block is placed in the disabled block table, as in step S612, the memory block will be placed in the disabled block table to avoid storing data in this memory block. In some other embodiments of the present invention, when the disabled block table has no more space, meaning that the storage apparatus is not usable anymore as the number of error correction bits being in a memory block which is exceeding the predetermined value and needs to be placed into the disabled block table, and the storage apparatus is locked so that the storage apparatus is not used for storing data anymore.

In summary, according to the present invention, a suitable block table is selected for placing a memory block according to the number of error correction bits in the memory block. Thereby, in the present invention, access to memory blocks at the edge of being disabled is reduced and the lifespan of the storage apparatus is extended. Moreover, since those memory blocks having the same number of error correction bits are placed in the same block table, the user can monitor the healthiness of the storage apparatus efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage apparatus, comprising:
   an interface unit, for transmitting data through a data transmission interface;
   an access control unit, coupled to the interface unit for accessing data; and
   a memory unit, coupled to the access control unit comprising:
      a plurality of memory blocks, for storing data, wherein each of the memory blocks has n error correction bits, wherein n is a positive integer greater than or equal to 1; and
      a plurality of block tables, having different storing priorities, wherein memory blocks having the same number of error correction bits are placed into the same block table, and the less error correction bits a memory block has, the higher storing priority the block table has in which the memory block is placed, wherein the access control unit stores data into the memory blocks in each of the block tables according to the storing priority of the block table.

2. The storage apparatus according to claim 1, wherein the block table for storing memory blocks having less error correction bits has higher priority so that the access control unit stores data into the block table having higher priority first.

3. The storage apparatus according to claim 1, wherein when the access control unit stores data, the block tables comprise:

a plurality of normal block tables, wherein the numbers of error correction bits in the memory blocks in each of the normal block tables are not greater than a predetermined value; and a disabled block table, wherein the numbers of error correction bits in the memory blocks in the disabled block table are greater than the predetermined value so that the access control unit does not store data into the memory blocks in the disabled block table.

4. The storage apparatus according to claim 1, wherein the memory unit is a non-volatile memory.

5. The storage apparatus according to claim 4, wherein the non-volatile memory is a flash memory.

6. The storage apparatus according to claim 1, wherein the data transmission interface is a wireless transmission interface or a cable transmission interface.

7. The storage apparatus according to claim 6, wherein the cable transmission interface is a Universal Serial Bus (USB).

8. The storage apparatus according to claim 3, wherein the predetermined value is at least greater than or equal to 4.

9. A data storing method, suitable for a storage apparatus, the data storing method comprising:

providing a plurality of block tables having different storing priorities;

providing a plurality of memory blocks respectively placed in at least one of the block tables, the memory blocks respectively having n error correction bits, wherein n is a positive integer greater than or equal to 1, the memory blocks having the same number of error correction bits being placed in the same block table; and storing data into the memory blocks in the block tables according to the storing priorities of the block tables.

10. The data storing method according to claim 9, wherein the block tables comprise:

a plurality of normal block tables, wherein the numbers of error correction bits in the memory blocks in each of the normal block tables are not greater than a predetermined value; and a disabled block table, wherein the numbers of error correction bits in the memory blocks in the disabled block table are greater than the predetermined value, so that data is not stored in the memory blocks in the disabled block table.

11. The data storing method according to claim 10, wherein the step of sequentially storing data into the normal block tables comprises:

pointing a data transmission path to the block table having the highest storing priority;

detecting whether the block table to which the data transmission path is currently pointed to has extra storage space;

storing the data into the block table to which the data transmission path is currently pointed to when the block table has extra storage space;

detecting whether the block table to which the data transmission path is currently pointed to has the lowest storing priority when the block table has no extra storage space;

determining that the storage apparatus has no more storage space and giving up storing the data when the block table to which the data transmission path is currently pointed to has the lowest storing priority; and pointing the data transmission path to the block table having a next storing priority for storing data when the block table to which the data transmission path is currently pointed does not have the lowest storing priority.

12. The data storing method according to claim 9, wherein the storage apparatus is a non-volatile memory storage apparatus.

13. A data accessing method for a storage apparatus, comprising:

providing a plurality of block tables having different storing priorities;

providing a plurality of memory blocks respectively having n error correction bits, wherein n is a positive integer greater than or equal to 1;

while reading data from one of the memory blocks, determining the block table in which the memory block is placed according to the number of error correction bits in the memory block, so that the memory blocks in each of the block tables have the same number of error correction bits, and the less error correction bits a memory block has, the higher storing priority the block table has in which the memory block is placed; and while storing data into the storage apparatus, sequentially storing the data into the memory blocks in the block tables according to the storing priorities of the block tables.

14. The data accessing method according to claim 13, wherein the block tables comprise a plurality of normal block tables and a disabled block table.

15. The data accessing method according to claim 14, wherein the step of determining the block table in which each of the memory blocks is placed further comprises:

determining whether the number of error correction bits in the memory block is greater than a predetermined value;

when the number of error correction bits in the memory block is not greater than the predetermined value, moving the memory block from a current block table to another normal block table; and when the number of error correction bits in the memory block is greater than the predetermined value, moving the memory block to the disabled block table so that data is not stored into the memory blocks in the disabled block table.

16. The data accessing method according to claim 13, wherein the storage apparatus is a non-volatile memory storage apparatus.

* * * * *